(12) United States Patent
McKinney

(10) Patent No.: US 8,961,659 B2
(45) Date of Patent: Feb. 24, 2015

(54) ELECTRICALLY ENHANCED AIR FILTRATION SYSTEM USING REAR FIBER CHARGING

(75) Inventor: Peter J. McKinney, Boulder, CO (US)

(73) Assignee: Carrier Corporation, Farmington, CT (US)

( * ) Notice: Subject to any disclaimer, the term of this patent is extended or adjusted under 35 U.S.C. 154(b) by 914 days.

(21) Appl. No.: 13/120,824

(22) PCT Filed: Oct. 20, 2009

(86) PCT No.: PCT/US2009/061376
§ 371 (c)(1),
(2), (4) Date: May 25, 2011

(87) PCT Pub. No.: WO2010/048223
PCT Pub. Date: Apr. 29, 2010

(65) Prior Publication Data
US 2011/0219954 A1    Sep. 15, 2011

Related U.S. Application Data

(60) Provisional application No. 61/106,938, filed on Oct. 20, 2008.

(51) Int. Cl.
*B03C 3/01* (2006.01)
*B03C 3/14* (2006.01)
(Continued)

(52) U.S. Cl.
CPC .............. *B03C 3/09* (2013.01); *B01D 46/0032* (2013.01); *B01D 46/521* (2013.01); *B03C 3/025* (2013.01); *B03C 3/12* (2013.01); *B03C 3/08* (2013.01); *B03C 3/155* (2013.01)
USPC ................ 96/55; 96/56; 96/57; 96/58; 96/59; 96/60; 96/61; 96/62; 96/63; 96/64; 96/65; 96/66; 96/67; 96/68; 96/69; 96/70; 96/71; 96/72; 96/73; 96/74; 96/75; 96/76; 96/77; 96/78; 96/79; 96/80; 422/121; 422/186.04; 55/422

(58) Field of Classification Search
CPC ............ B03C 3/00; B03C 3/155; B03C 3/09; B03C 3/41; B01D 46/10; B01D 46/0036; B01D 2253/102; B01D 3/38; B01D 3/28; B01D 39/1623; B01D 2239/0435; B01D 2239/1123; F24F 3/166
USPC ........ 96/55–83, 18; 55/422; 422/121, 186.04, 422/124
See application file for complete search history.

(56) References Cited

U.S. PATENT DOCUMENTS 5,403,383 A * 4/1995 Jaisinghani ....................... 95/69
5,593,476 A   1/1997 Coppom
(Continued)

FOREIGN PATENT DOCUMENTS

JP    08/112549 A    5/1996

OTHER PUBLICATIONS

International Search Report and Written Opinion for related International Application No. PCT/US2009/061376; report dated Jun. 7, 2010.
(Continued)

*Primary Examiner* — Amber Orlando
(74) *Attorney, Agent, or Firm* — Miller, Matthias & Hull LLP

(57) ABSTRACT

An electrically enhanced air filtration system is disclosed which uses rear fiber charging is disclosed. In particular, a fibrous filter may be placed in an upstream position within the system with one or more ionization arrays positioned downstream or to the rear of the fibrous filter in terms of airflow direction. The fibrous filter may include a grounded side and fiber side with the grounded side being upstream of the fiber side. The ionization array may include a plurality of electrodes each extending unidirectionally toward the fibrous filter.

18 Claims, 4 Drawing Sheets

(51) Int. Cl.

| | | |
|---|---|---|
| *B03C 3/00* | (2006.01) | |
| *B03C 3/02* | (2006.01) | |
| *B03C 3/40* | (2006.01) | |
| *A62B 7/08* | (2006.01) | |
| *B01J 19/08* | (2006.01) | |
| *B01J 19/12* | (2006.01) | |
| *B01D 41/00* | (2006.01) | |
| *B01D 45/18* | (2006.01) | |
| *B01D 46/42* | (2006.01) | |
| *B03C 3/09* | (2006.01) | |
| *B01D 46/00* | (2006.01) | |
| *B01D 46/52* | (2006.01) | |
| *B03C 3/12* | (2006.01) | |
| *B03C 3/08* | (2006.01) | |
| *B03C 3/155* | (2006.01) | |

(56) References Cited

U.S. PATENT DOCUMENTS

| | | |
|---|---|---|
| 5,993,521 A | 11/1999 | Loreth et al. |
| 6,090,189 A | 7/2000 | Wikstrom et al. |
| 6,241,810 B1 | 6/2001 | Wikstrom et al. |
| 6,245,126 B1 | 6/2001 | Feldman et al. |
| 6,245,132 B1 | 6/2001 | Feldman et al. |
| 6,454,839 B1 | 9/2002 | Hagglund et al. |
| 6,471,746 B2 | 10/2002 | Hagglund et al. |
| 6,635,106 B2 | 10/2003 | Katou et al. |
| 7,025,806 B2 | 4/2006 | Coppom et al. |
| 7,160,363 B2 | 1/2007 | Kulmala et al. |
| 7,279,028 B2 | 10/2007 | Bergeron et al. |
| 7,368,003 B2 * | 5/2008 | Crapser et al. ............ 96/52 |
| 7,452,410 B2 | 11/2008 | Bergeron et al. |
| 7,513,933 B2 | 4/2009 | Coppom et al. |
| 7,531,028 B2 | 5/2009 | Mello et al. |
| 2006/0130657 A1 * | 6/2006 | Bohlen et al. ............ 96/58 |
| 2006/0288871 A1 * | 12/2006 | Crapser et al. ............ 96/52 |
| 2007/0137486 A1 * | 6/2007 | Bergeron et al. ............ 96/66 |
| 2008/0034973 A1 | 2/2008 | Griffiths et al. |
| 2008/0156186 A1 | 7/2008 | McKinney |
| 2008/0170971 A1 | 7/2008 | Bergeron et al. |
| 2009/0165648 A1 | 7/2009 | Frank et al. |

OTHER PUBLICATIONS

International Preliminary Report on Patentability for related International Application No. PCT/US2009/061376; report dated May 5, 2011.

* cited by examiner

ELECTRICALLY ENHANCED AIR FILTRATION SYSTEM USING REAR FIBER CHARGING

CROSS-REFERENCE TO RELATED APPLICATION

The present application is a National Stage application of PCT Application Number PCT/US09/61376 filed on Oct. 20, 2009 and claims priority under 35 U.S.C. 119(e) to U.S. Provisional Patent Application No. 61/106,938 filed on Oct. 20, 2008, the disclosure of which is herein incorporated by reference in its entirety.

FIELD OF THE DISCLOSURE

The present disclosure generally relates to electrically enhanced air filtration systems and, in particular, relates to electrically enhanced air filtration systems using rear fiber charging.

BACKGROUND OF THE DISCLOSURE

Air filtration is used in a wide variety of environments to remove pollutants in an attempt to purify the air. Though there exist several types of air-filtration technologies such as mechanical filters, frictional electrostatic filters, and electric filters, active electrically enhanced air-filtration systems have become increasingly popular because of their high efficiency.

Although numerous publications and patents exist for electrically enhanced filtration using a corona pre-charger, less information has been published on the relative importance of the various electrostatic collection mechanisms acting within such filters. A conceptual diagram of a prior art electrically enhanced fibrous filtration system is shown in FIG. 1. The electrically enhanced fibrous filtration system includes an upstream metallic screen through which air enters the filter, a pre-charging unit downstream from the screen and a filter downstream of the pre-charger. The pre-charging unit may be provided with bi-directional corona discharges as shown. As uncharged particles enter the filtration system, the particles get charged by the electric field created in the space-region between the pre-charger unit and the filter. The filter is electrically enhanced in that it is actively polarized so as to attract charged particles to portions of the fibers with a charge opposite that of the particles.

Typically, particle and fiber interactions are mainly explained in terms of three electrostatic forces of attraction: a) polarization force due to dipoles induced within the filter fibers and/or particles by external electrical field; b) image force due to induction of charges on uncharged fibers by charged particles; c) columbic force due to charged particles and polarized or charged fibers. The electrostatic interactions are discussed primarily in terms of the gross parameters of electric field strength across the fibrous media and particle charge. The concept of unipolar ionic emission to charge the filter fibers and enhance the collection efficiency has not been successfully employed. The unipolar ionic fiber charge, originating from the corona discharge electrode and accumulated on the filter fibers, produces a non-uniform electric field around the fiber which causes a force of attraction between the charged fiber and both oppositely charged and neutral particles. In the case of a neutral particle the attraction is caused by induction of a dipole within the particle.

In light of the foregoing, improvements continue to be sought for electrically enhanced air filtration devices.

SUMMARY OF THE DISCLOSURE

In accordance with one aspect of the disclosure a particle collection mechanism for use in filtering airflow moving from a upstream direction to downstream direction is disclosed which comprises a fibrous filter having a grounded side and a fiber side, the fibrous filter being oriented such that the grounded side is directed toward the upstream direction and the fiber side is directed toward the downstream direction; and a first ionization array positioned downstream of the fibrous filter, the ionization array having a plurality of electrodes directed toward the fibrous filter.

In accordance with another aspect of the disclosure a particle collection mechanism for use in filtering airflow moving from an upstream direction to downstream direction is disclosed which comprises a fibrous filter having a grounded side and a fiber side oriented such that the grounded side is directed toward the upstream direction, and the fiber side is directed toward the downstream direction; a first ionization array positioned downstream of the fibrous filter, the first ionization array having a plurality of electrodes directed toward the fibrous filter; a first grounded screen positioned downstream of the first ionization array; a second ionization array positioned downstream of the first grounded screen, the second ionization array having a plurality of electrodes directed toward the first grounded screen; a third ionization array positioned upstream of the fibrous filter, the third ionization array having a plurality of electrodes; and a second grounded screen positioned upstream of the third ionization array, the plurality of electrodes on the third ionization array being directed toward the second grounded screen.

In accordance with yet another aspect of the disclosure, an air-filtration system is disclosed which comprises a particle collection mechanism for filtering airflow moving from an upstream direction to a downstream direction, and an air mover configured to cause air to flow in the upstream to downstream direction through the particle collection mechanism. The particle collection mechanism may include a fibrous filter having a grounded side and a fiber side, the fibrous filter being oriented such that the grounded side is directed toward the upstream direction and the fiber side is directed toward the downstream direction; and a first ionization array positioned downstream of the fibrous filter, the ionization array having a plurality of electrodes directed toward the fibrous filter; and an air mover configured to cause air to flow in the upstream to downstream direction through the particle collection mechanism.

Other advantages and features will be apparent from the following detailed description when read in conjunction with the attached drawings.

BRIEF DESCRIPTION OF THE DRAWINGS

For a more complete understanding of the disclosed methods and systems, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and systems or which render other details difficult to perceive may have been omitted. It should be understood, of course, that this disclosure is not limited to the particular embodiments illustrated herein.

DETAILED DESCRIPTION OF THE DISCLOSURE

Figure 1:
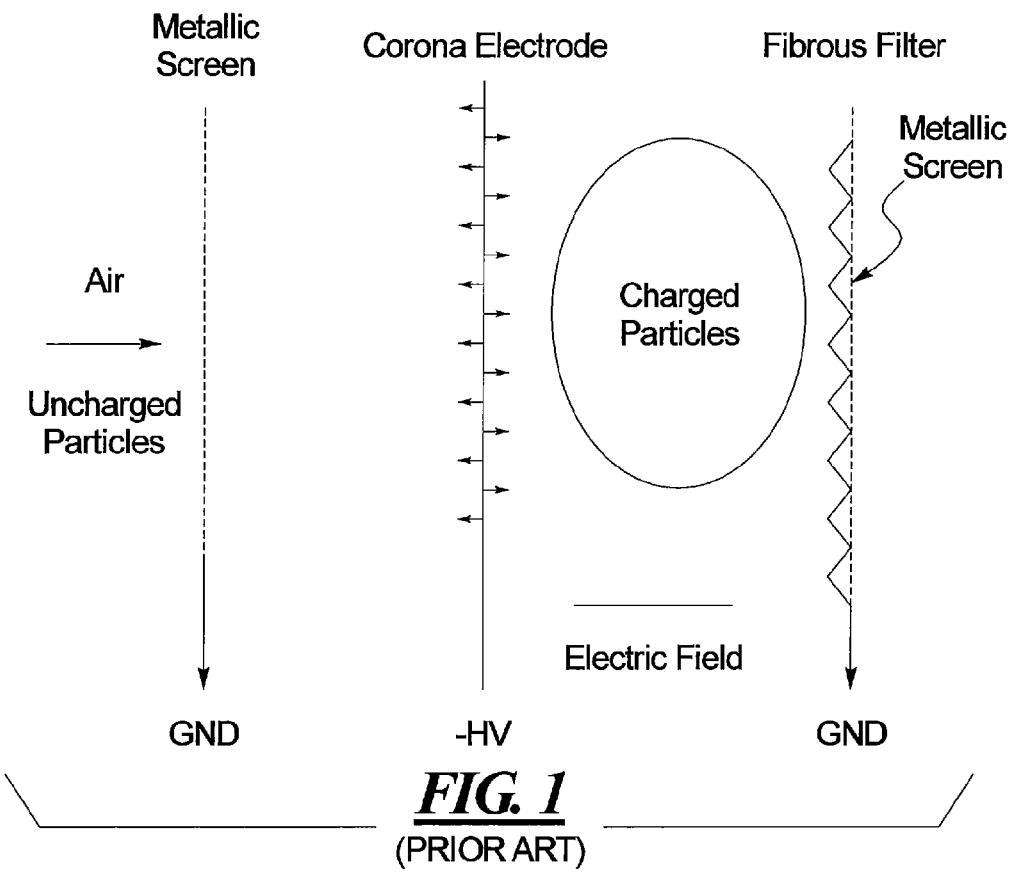
FIG. 1 is a schematic representation of a prior art electrically enhanced air filtration system.
Figure 2:
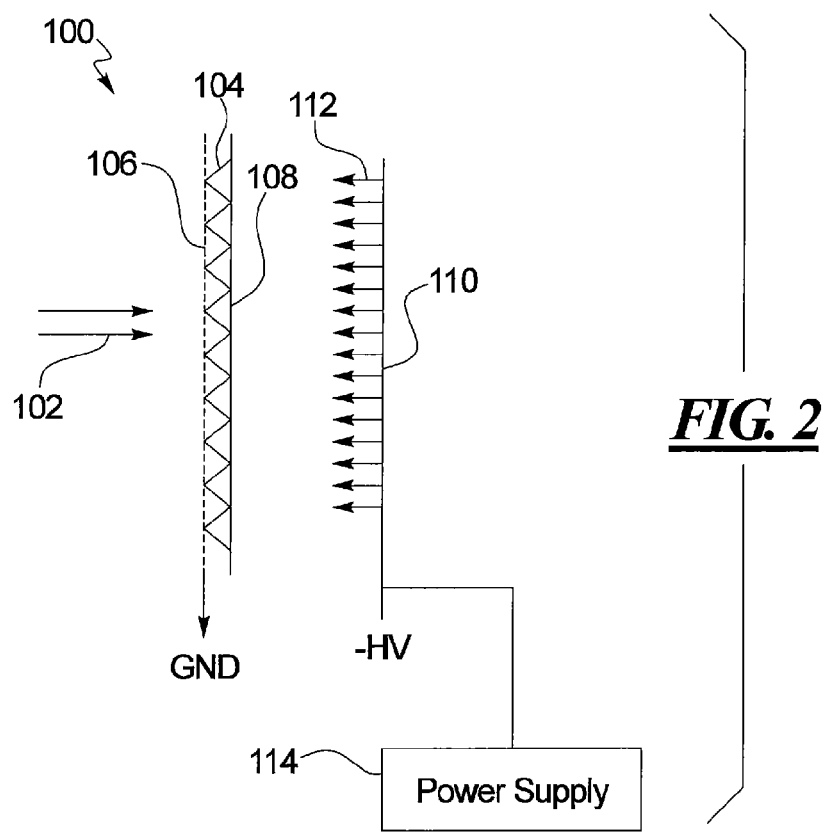
FIG. 2 is a schematic representation of a first embodiment of a particle collection mechanism constructed in accordance with the teachings of the present disclosure.

Referring now to the drawings, and with specific reference to FIG. 2, a particle collection mechanism constructed in accordance with the teachings of the disclosure is generally referred to by reference numeral 100. The particle collection mechanism 100 may be used to filter particles out of a moving airstream or airflow 102. As used herein, it is to be understood that air flow 102 moves from an upstream direction to a downstream direction. With reference to the drawings of this disclosure this equates to a left to right airflow, but this is to be understood as exemplary only.

The particle collection mechanism 100 may include a fibrous filter 104 having a grounded side 106 and a fiber side 108. The grounded side 106 may be grounded by providing a metallic screen or the like thereon and suitably connected to ground, while the fiber side may include a plurality of pleats or the like formed from individual fibers of a filter media. The particle collection mechanism 100 may further include a first ionization array 110 positioned downstream from the fibrous filter 104. The first ionization array 110 may be provided as a unidirectional fiber charger in which a plurality of electrodes 112 all extend in the same direction. In the depicted embodiment, this results in the electrodes 112 (and their emitted corona discharges) all extending toward the fiber side 108 of the fibrous filter 104. As used herein, "electrode" may be constructed to mean a protrusion which is sufficiently sharp to produce a corona discharge due to the relative potential of the ionization array.

The first ionization array 108 may be biased with a positive polarity or a negative polarity. A power supply 114 may be used to continuously energize the first ionization array 110. In one embodiment, the first ionization array 110 may be energized with ionization voltages ranging from $^\pm$12 kV to $^\pm$24 kV, although other high voltages anywhere between corona onset and sparkover are possible. In another embodiment, the voltage may not be DC, but pulsed at a frequency or interval such that a charge is maintained on the filter fibers. The first ionization array 108 charges the fibers within the fiber side 108 on the fibrous filter 104. The presence of unipolar ions at the fiber side 108 charges the fibers and creates a strong, non-uniform gradient force surrounding each fiber. This produces electrostatic attraction between neutral or charged particles and filter fibers. Accordingly, in operation, airflow 102 moves through the fibrous filter 104, and particles within the airflow are removed when attracted to the polarized fibers of the filter 104.

Figure 3:
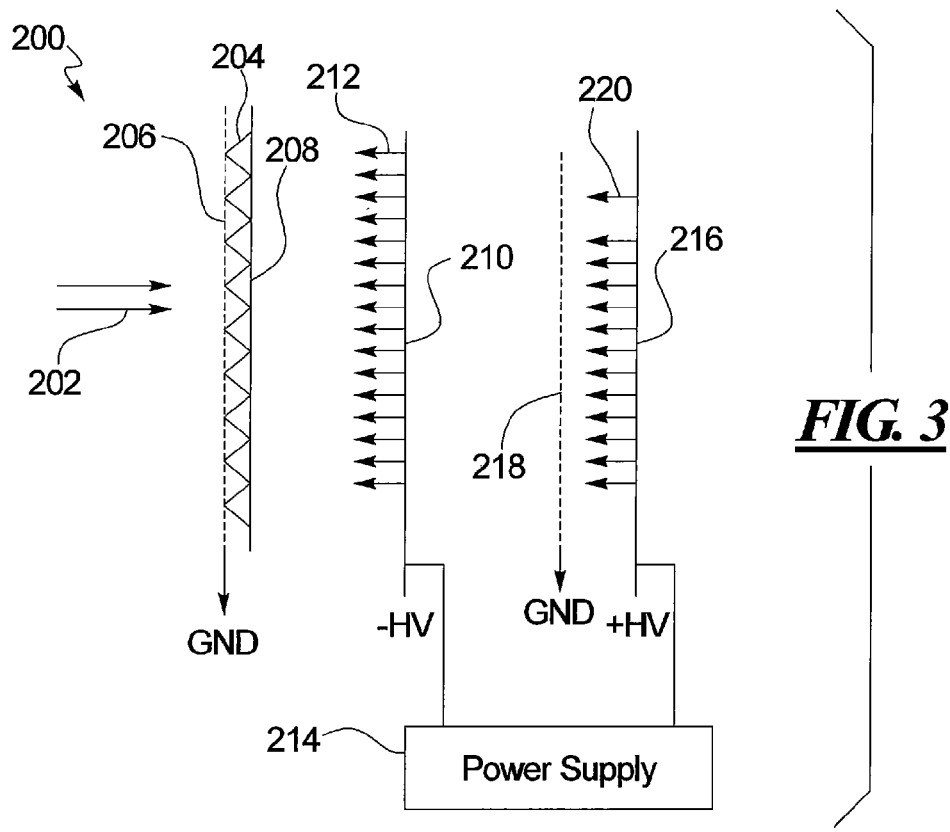
FIG. 3 is a schematic representation of a second embodiment of a particle collection mechanism constructed in accordance with the teachings of the present disclosure.

In a second embodiment illustrated in FIG. 3, a particle collection mechanism 200 is provided which may, relative to the first embodiment, further include a second ionization array 216 to neutralize uncaptured particles as explained in further detail herein. The second ionization array 216 may be provided downstream of a first ionization array 210. A first grounded screen 218 may also be positioned between the first ionization array 210 and the second ionization array 216. The second ionization array 216 may be provided as a unidirectional neutralizer in which plurality of electrodes 220 are all directed toward the first grounded screen 218. The first ionization array 210 may also have a plurality of electrodes 212 extending unidirectionally therefrom, and may be provided downstream of a fibrous filter 204 as with the first embodiment. Similarly, the fibrous filter 204 may include a grounded side 206 provided upstream of a fiber side 208 in a manner similar to the first embodiment.

In operation, the second ionization array 216 may biased with a polarity opposite to that of the first ionization array 210 in order to neutralize charged particles not collected by the fibrous filter 204 and moving downstream within airflow 202 through the first ionization array 210. More specifically, if any charged particles are not collected by the fibrous filter 204, when they encounter the corona discharge of the oppositely charged electrodes 220 of the second ionization array 216, their charges will be cancelled out or neutralized. A power supply 214 may also be used to continuously energize the second ionization array 216. The second ionization array 216 may be energized with ionization voltages ranging from $^\pm$12 kV to $^\pm$24 kV as with the first embodiment, but similarly other high voltage ranges are possible. The current directed through the second ionization array 216 may be kept at half the magnitude of the first ionization array 210 or some other fraction thereof to improve performance.

Figure 4:
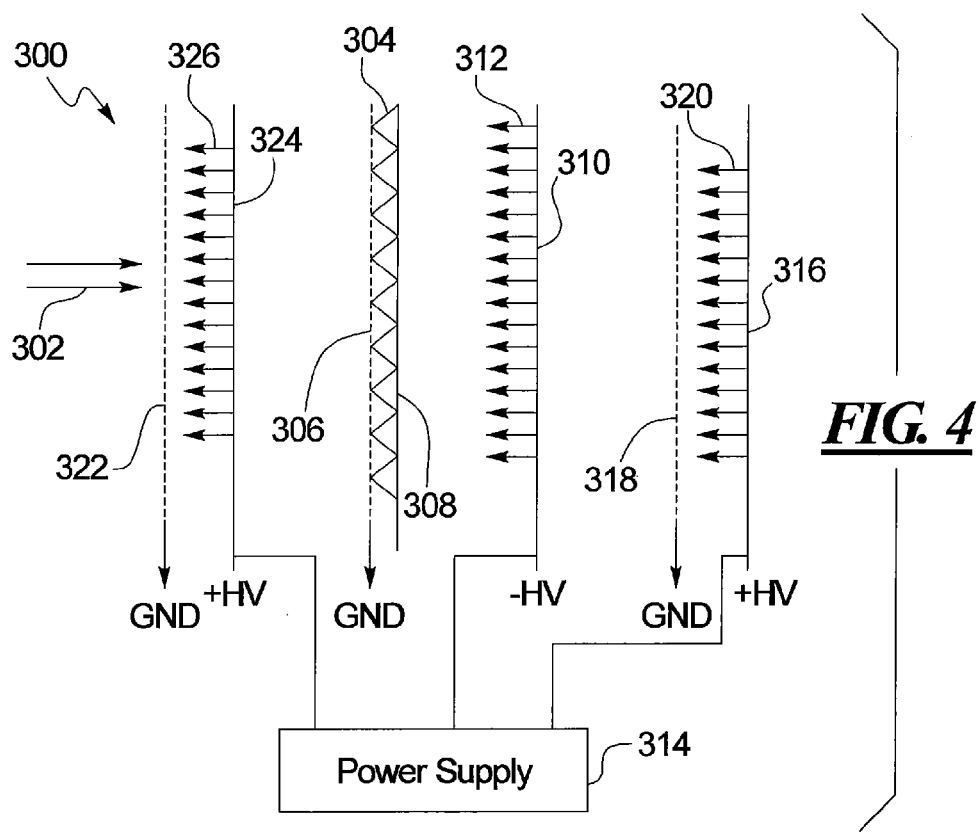
FIG. 4 is a schematic representation of a third embodiment of a particle collection mechanism constructed in accordance with the teachings of the present disclosure.

In a third embodiment of the present disclosure, a particle collection mechanism 300 is provided which oppositely charges fibers and particles. As illustrated in FIG. 4, a fibrous filter 304 is oriented such that a grounded side 306 is upstream of a fiber side 308. The particle collection mechanism 300 may further include a first ionization array 310 positioned downstream of the fibrous filter 304. The first ionization array 310 may be provided as a unidirectional fiber charger in which plurality of electrodes 312 are all directed upstream towards the fiber side 308 of the fibrous filter 304. In addition, the particle collection mechanism 300 may include of a second ionization array 316 and a first grounded screen 318. The first grounded screen 318 may be positioned downstream of the first ionization array 310. The second ionization array 316 may be positioned downstream of the first grounded screen 318. The second ionization array 316 may be provided as a unidirectional neutralizer in which plurality of electrodes 320 are all directed upstream toward the first grounded screen 318 in a manner similar to the second embodiment. The particle collection mechanism 300 may further include of a second grounded screen 322 and a third ionization array 324 positioned upstream of the fibrous filter 304. The third ionization array 324 may be provided as a unidirectional pre-charger with plurality of electrodes 326 are all directed upstream toward the second grounded screen 322. The second grounded screen 322 may be positioned upstream from the third ionization array 324. The second ionization array 316 and the third ionization array 324 may be biased with the opposite polarities to that of the first ionization array 310.

Furthermore, the first ionization array 310 may be biased with a positive polarity or a negative polarity.

In order to charge the arrays, a power supply 314 may be used to continuously energize the first, second and third ionization arrays, 310, 316, 324, respectively, in a manner similar to the previously described embodiments. The first, second, and third ionization arrays 310, 316 and 324 may be energized with ionization voltages ranging from $\pm12$ kV to $\pm24$ kV, for example. In operation, the first ionization array 310 may be used to charge the fiber side 308 on the fibrous filter 304. The third ionization array 324 may be used to charge incoming particles first entering the particle collection mechanism 300 with a charge opposite to that of the fiber side 308. In so doing, the likelihood of attraction between the particles and fibers is enhanced and filtering efficiency is improved. As with the second embodiment, the second ionization array 316 may be used to neutralize exiting particles and prevent charged particles from exiting the particle collection mechanism 300 into the ambient environment.

Figure 5:
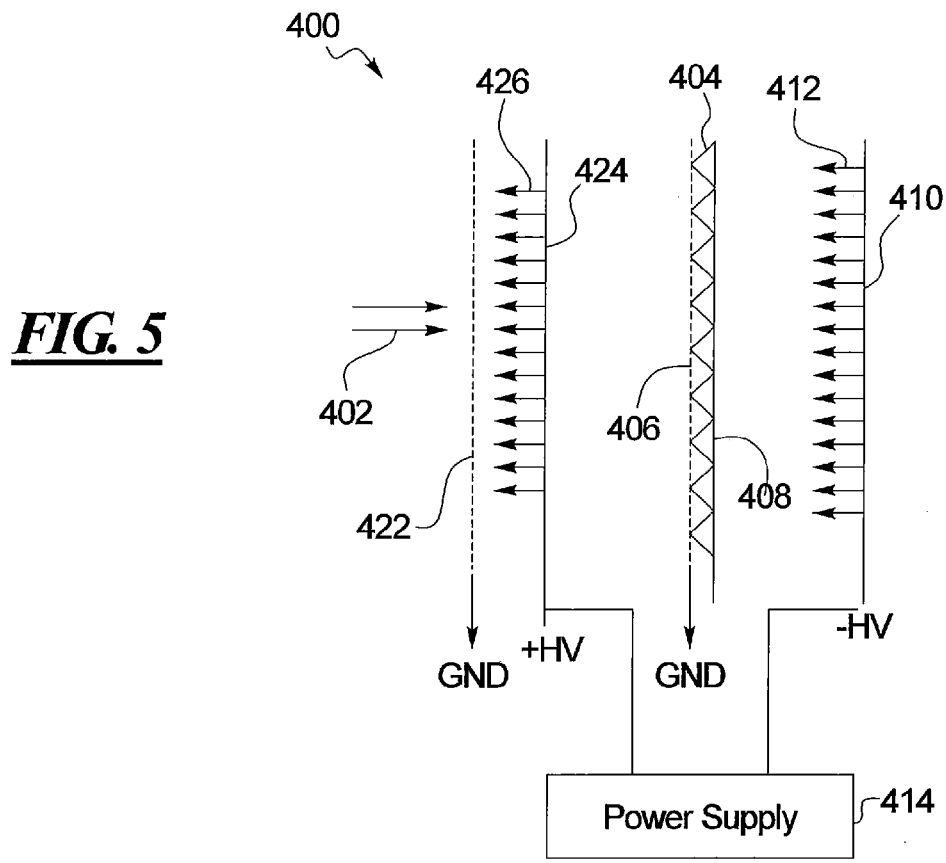
FIG. 5 is a schematic representation of a fourth embodiment of a particle collection mechanism constructed in accordance with the teachings of the present disclosure.

In a fourth embodiment depicted in FIG. 5, the neutralizer maybe omitted. More specifically, the particle collection mechanism 400 of the fourth embodiment may include a fibrous filter 404 having a grounded side 406 upstream of a fiber side 408. Downstream of the fibrous filter 404, a first ionization array 410 may be provided with a plurality of electrodes 412 energized by a power supply 414 and directed toward the fiber side 408. As will be noted in FIG. 5, a second ionization array or neutralizer is not provided in this embodiment further downstream of the first ionization array 410. However, in this fourth embodiment, a third ionization array 424 is provided upstream of the fibrous filter 404, with a second grounded screen 422 being provided upstream of the third ionization array 424. It can therefore be seen that in this embodiment, a neutralizer is not provided, but a pre-charger and rear ionization array are provided.

Figure 6:
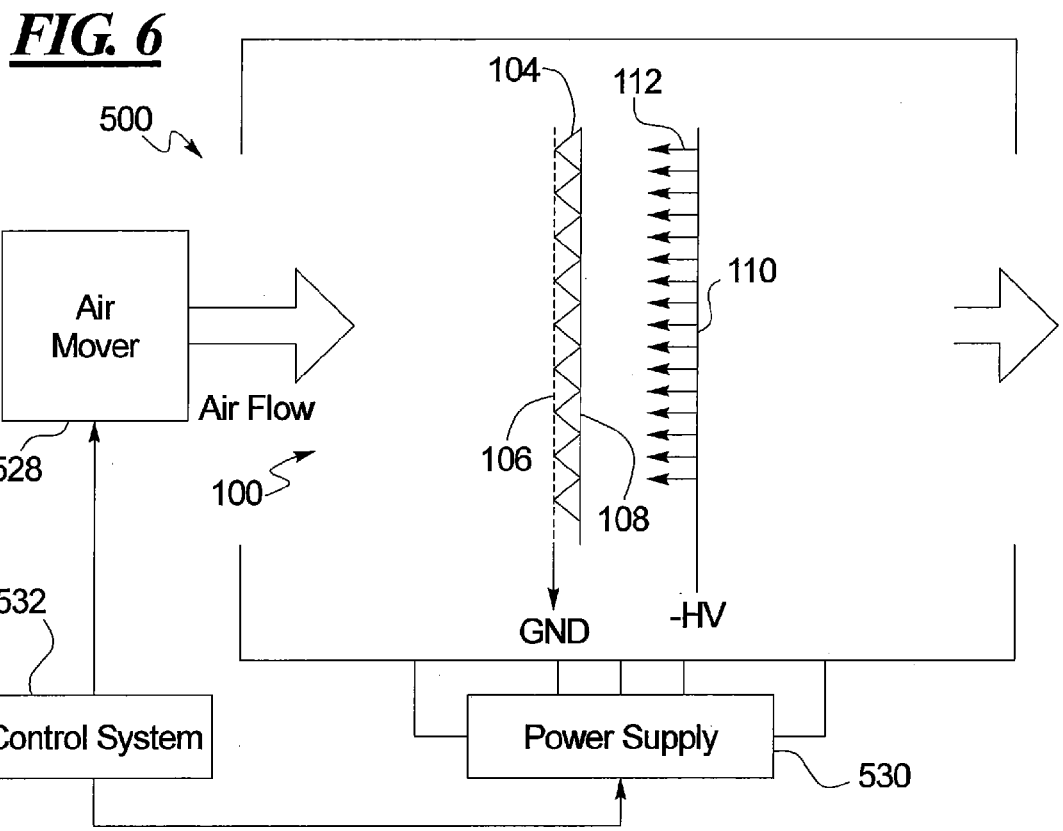
FIG. 6 is a schematic representation of an air-filtration system including a particle collection mechanism according to the present disclosure.
Figure 7:
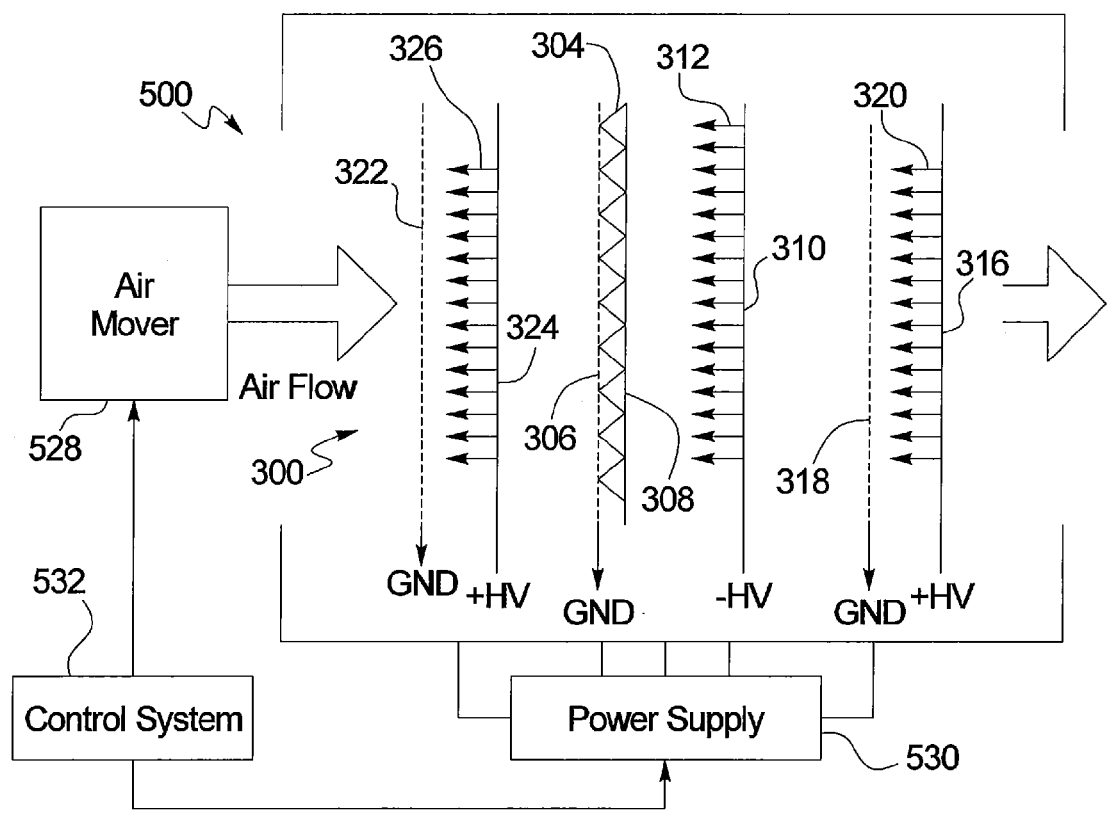
FIG. 7 is a schematic representation of another embodiment of an air-filtration system including a particle collection mechanism according to the present disclosure.

Any of the foregoing particle collection mechanisms may be used as part of an overall air-filtration system 500 as illustrated in FIGS. 6 and 7. For example, the air-filtration system 500 may be provided in the form of, or as part of, a commercial or residential HVAC system including, but not limited to, an air conditioner, a furnace, a boiler, a humidifier, a dehumidifier, or the like. In such an air-filtration system 500, an air mover 528, a power supply 530, and a control system 532, may all be provided in addition to one of the particle collection mechanisms 100, 200, 300 or 400 mentioned above. FIG. 6 illustrates the air-filtration system 500 with the particle collection mechanism 100. FIG. 7 illustrates the air-filtration system 500 with the particle collection mechanism 300. An air filtration system 500 using particle collection mechanisms 200 or 400 could also be similarly provided. The air mover 528, which may be provided in the form of an electrically powered fan or the like, causes airflow 502 to move through the particle collection mechanism, 100, 200, 300, 400 in an upstream to downstream direction. The power supply 530 provides electrical power to the air mover 528. The control system 532 controls the operation of the air mover 528 and the power supply 530 by energizing the air mover 528 either upon physical actuation of a switch provided as part of the control system 532, or upon tripping of a sensor provided as part of a closed loop control system comparing a sensed parameter to a stored value in the control system 532.

INDUSTRIAL APPLICABILITY

In light of the foregoing, it can be seen that the present disclosure sets forth multiple embodiments of an electrically enhanced air filtration system, and particle collection mechanism for use with such a system, which utilizes rear fiber charging to improve filtering performance. Such a system can be provided in the form of, or as part of, an overall HVAC system including, but not limited to, an air conditioner, a furnace, an air handler, a boiler, a humidifier, a dehumidifier, or the like. By placing the filter media upstream in the system before a unidirectional ionization array and after a grounded screen, the fibers of the filter are polarized from the rear. In so doing, any neutral or oppositely charged particles in the airflow entering the system will be attracted and collected. Moreover, placement of the filter upstream in the system allows for the majority of the particles to be collected in the fibrous filter as opposed to other components of the electrically enhanced system, thereby facilitating replacement of the filter only without significant cleaning or replacement of other components being required. In addition, by bathing the rear fibers in charge, the system is provided with a germicidal effect in relation to the airflow as well. With alternative embodiments, pre-charging of the air flow con be provided prior to reaching the filter to enhance attraction, as well as neutralizing of any charged particles which are not collected by the filter and which attempt to exit the system.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A particle collection mechanism for use in filtering airflow moving from an upstream direction to a downstream direction, comprising:
   a fibrous filter having a grounded side and a fiber side, the fibrous filter being oriented such that the grounded side is directed toward the upstream direction and the fiber side is directed toward the downstream direction;
   a first ionization array positioned downstream of the fibrous filter, the ionization array having a plurality of electrodes permitting unipolar ions to be directed toward the fibrous filter
   a first grounded screen downstream of the fibrous filter; and
   a second ionization array positioned downstream of the first grounded screen, the second ionization array having a plurality of electrodes directed toward the first grounded screen.

2. The particle collection mechanism of claim 1, wherein the first ionization array is unidirectional.

3. The particle collection mechanism of claim 1, wherein the first ionization array is negatively polarized.

4. The particle collection mechanism of claim 1, wherein the first ionization array is positively polarized.

5. The particle collection mechanism of claim 1, further comprising a power supply connected to the ionization array.

6. The particle collection mechanism of claim 1, further comprising a third ionization array upstream of the fibrous filter and a second grounded screen upstream of the third ionization array.

7. A particle collection mechanism for use in filtering airflow moving from a upstream direction to downstream direction, comprising:
   a fibrous filter having a grounded side and a fiber side oriented such that the grounded side is directed toward the upstream direction, and the fiber side is directed toward the downstream direction;
   a first ionization array positioned downstream of the fibrous filter, the first ionization array having a plurality of electrodes directed toward the fibrous filter;

a first grounded screen positioned downstream of the first ionization array;

a second ionization array positioned downstream of the first grounded screen, the second ionization array having a plurality of electrodes directed toward the first grounded screen;

a third ionization array positioned upstream of the fibrous filter, the third ionization array having a plurality of electrodes; and a second grounded screen positioned upstream of the third ionization array, the plurality of electrodes on the third ionization array being directed toward the second grounded screen.

8. The particle collection mechanism of claim 7, wherein the second and third ionization arrays are negatively polarized and the first ionization array is positively polarized.

9. The particle collection mechanism of claim 7, wherein the second and third ionization arrays are positively polarized, and the first ionization array is negatively polarized.

10. The particle collection mechanism of claim 7, wherein the first, second, and third ionization arrays are unidirectional.

11. The particle collection mechanism of claim 7, further comprising a power supply connected to the first, second and third ionization arrays.

12. An air-filtration system comprising:

a particle collection mechanism for filtering airflow moving from an upstream direction to a downstream direction, the particle collection mechanism including:

a fibrous filter having a grounded side and a fiber side, the fibrous filter being oriented such that the grounded side is directed toward the upstream direction and the fiber side is directed toward the downstream direction;

a first ionization array positioned downstream of the fibrous filter, the ionization array having a plurality of electrodes permitting unipolar ions to be directed toward the fibrous filter;

a first grounded screen downstream of the first ionization array; and a second ionization array positioned downstream of the grounded screen, the second ionization array having a plurality of electrodes directed toward the first grounded screen; and an air mover configured to cause air to flow in the upstream to downstream direction through the particle collection mechanism.

13. The air-filtration system of claim 12, further comprising a power supply connected to the first ionization array.

14. The air-filtration system of claim 12, wherein the first ionization array is negatively polarized.

15. The air-filtration system of claim 12, wherein the first ionization array is positively polarized.

16. The air-filtration system of claim 12, wherein the first ionization array is unidirectional.

17. The air-filtration system of claim 12, further comprising a third ionization array upstream of the fibrous filter and a second grounded screen upstream of the third ionization array.

18. The air-filtration system of claim 17, wherein the third ionization array has the same polarity as the second ionization array.

* * * * *